US012646427B2

(12) United States Patent (10) Patent No.: US 12,646,427 B2
Shiau (45) Date of Patent: Jun. 2, 2026

(54) SMART LICENSE PLATE

(71) Applicant: WISTRON CORPORATION, New Taipei City (TW)

(72) Inventor: Yi-Hau Shiau, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 459 days.

(21) Appl. No.: 18/385,550

(22) Filed: Oct. 31, 2023

(65) Prior Publication Data

US 2024/0371302 A1 Nov. 7, 2024

(30) Foreign Application Priority Data

May 3, 2023 (TW) .................................. 112116520

(51) Int. Cl.
| *G09F 13/00* | (2006.01) |
| *B60Q 1/56* | (2006.01) |
| *B60R 13/10* | (2006.01) |
| *G09F 13/18* | (2006.01) |

(52) U.S. Cl.
CPC ............. *G09F 13/005* (2013.01); *B60Q 1/56* (2013.01); *B60R 13/10* (2013.01); *B60R 13/105* (2013.01); *G09F 13/18* (2013.01)

(58) Field of Classification Search
CPC .......... B60Q 1/56; B60R 13/10; B60R 13/105
See application file for complete search history.

(56) References Cited

U.S. PATENT DOCUMENTS

| 2,057,249 | A | * | 10/1936 | Rioux | ...................... | B60Q 1/56 |
| | | | | | | 40/205 |
| 9,688,189 | B1 | * | 6/2017 | Salter | ........................ | B60Q 1/56 |
| 9,688,190 | B1 | * | 6/2017 | Johnson | .................. | B60R 13/10 |
| 2013/0170240 | A1 | * | 7/2013 | Ballatan | ................... | B60Q 1/56 |
| | | | | | | 362/497 |
| 2017/0129422 | A1 | * | 5/2017 | Gloodt | ..................... | B60Q 1/56 |
| 2022/0410797 | A1 | * | 12/2022 | Spall | ....................... | B60R 13/10 |

FOREIGN PATENT DOCUMENTS

| CN | 208069570 | U | | 11/2018 | | |
| DE | 102011016416 | A1 | * | 10/2012 | ............. | B60R 13/10 |
| KR | 20230131010 | A | * | 9/2023 | ............. | G06V 20/58 |
| KR | 20230131399 | A | * | 9/2023 | ........... | G06V 20/625 |
| WO | WO-2009053082 | A1 | * | 4/2009 | ............. | B60R 13/10 |

* cited by examiner

*Primary Examiner* — Alexander K Garlen

(74) *Attorney, Agent, or Firm* — Brooks Kushman P.C.

(57) ABSTRACT

A smart license plate is disclosed, including a display assembly, a first light-emitting assembly, a second light-emitting assembly, and a controller. The display assembly includes a display panel, a frame and a motherboard, where the display panel has a display surface and a mounting surface, the frame is connected to the display surface and divides the display surface into an active region and a passive region, and the motherboard is connected to the mounting surface, and drives the display panel to selectively display a license plate image in the passive region. The first light-emitting assembly corresponds to the passive region, and the second light-emitting assembly corresponds to the active region. The controller coupled to and selectively drives the first light-emitting assembly and the second light-emitting assembly.

20 Claims, 11 Drawing Sheets

SMART LICENSE PLATE

CROSS-REFERENCE TO RELATED APPLICATION

This application claims the priority and benefit of Taiwan Patent Application No. 112116520, filed on May 3, 2023, now Taiwan Pat. No. I859839 B issued on Oct. 21, 2024, the disclosure of which is hereby incorporated in its entirety by reference herein.

TECHNICAL FIELD

A smart license plate is provided, especially a smart license plate with a display panel.

BACKGROUND

With the development of Internet of Vehicles applications, camera lenses can be provided to capture vehicle images, and the images are analyzed by using an arithmetic device to obtain vehicle information for each vehicle on the road. By way of example, after the camera lenses provided in a parking lot capture the vehicle images, the arithmetic device can analyze a license plate number from the vehicle image, and then judges whether the detected vehicle has completed payment, or controls a barrier gate to open. However, when ambient illumination is poor, the camera lens may not clearly capture the license plate number.

SUMMARY

In view of this, in some embodiments, a smart license plate includes a display assembly, a first light-emitting assembly, a second light-emitting assembly, and a controller. The display assembly includes a display panel, a frame and a motherboard. The display panel has a display surface and a mounting surface. The frame is connected to the display surface and divides the display surface into an active region and a passive region. The motherboard is connected to the mounting surface. The motherboard drives the display panel to selectively display, in the passive region, a license plate image. The first light-emitting assembly corresponds to the passive region and is configured to emit a first light ray towards the passive region when driven. The second light-emitting assembly corresponds to the active region and is configured to emit a second light ray towards the active region when driven. The controller is coupled to and selectively drives the first light-emitting assembly and the second light-emitting assembly.

Various embodiments are presented below for detailed explanation. However, the embodiments are only used as an example for explanation and do not limit the scope of protection of the present invention. Furthermore, some elements are omitted in the schematics in the embodiments to clearly display the technical features of the present invention. The same numerals in all schematics will be used for representing the same or similar elements.

DETAILED DESCRIPTION

Figure 1:
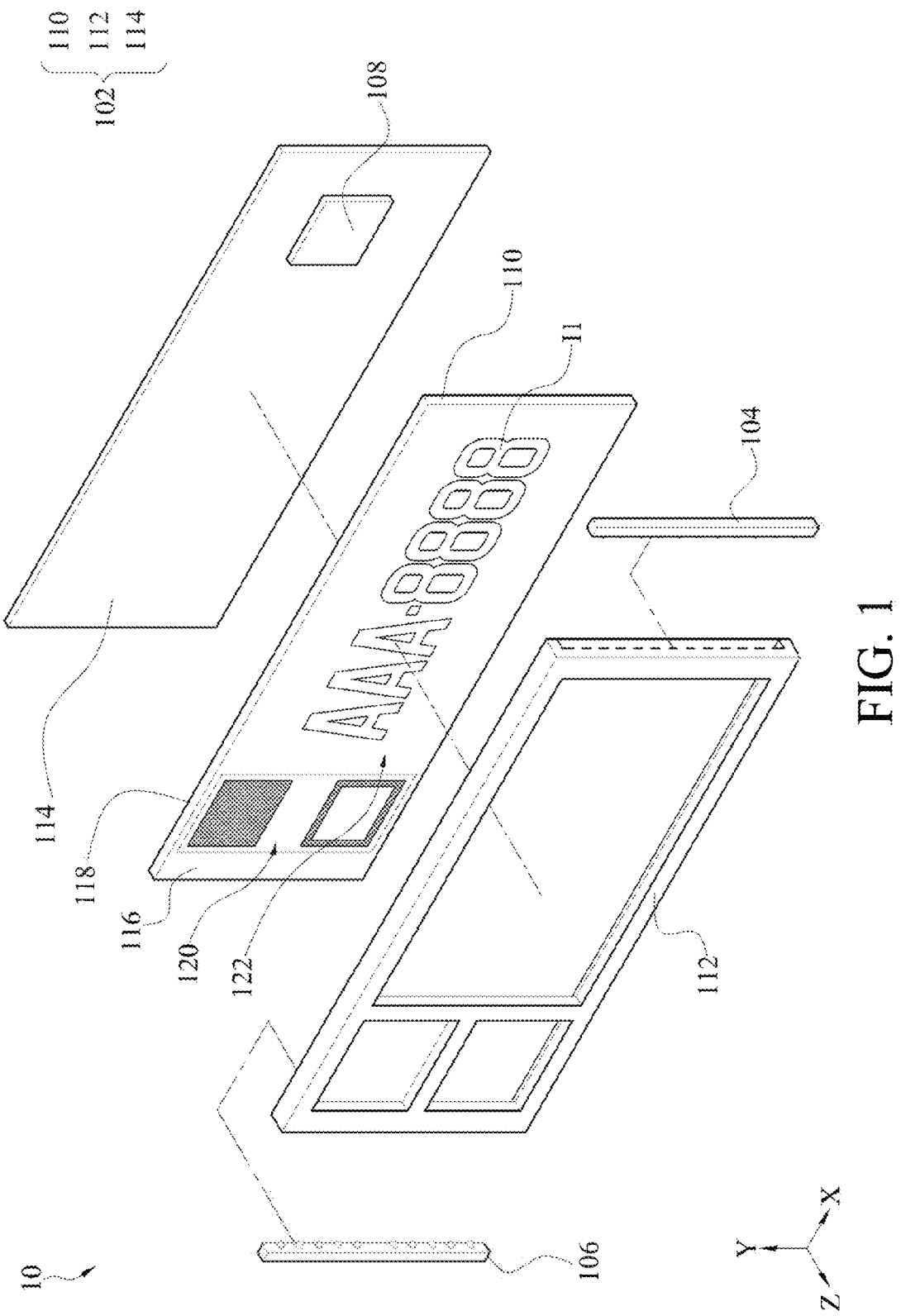
FIG. 1 is a schematic three-dimensional exploded diagram of a smart license plate in some embodiments according to the present invention.
Figure 2:
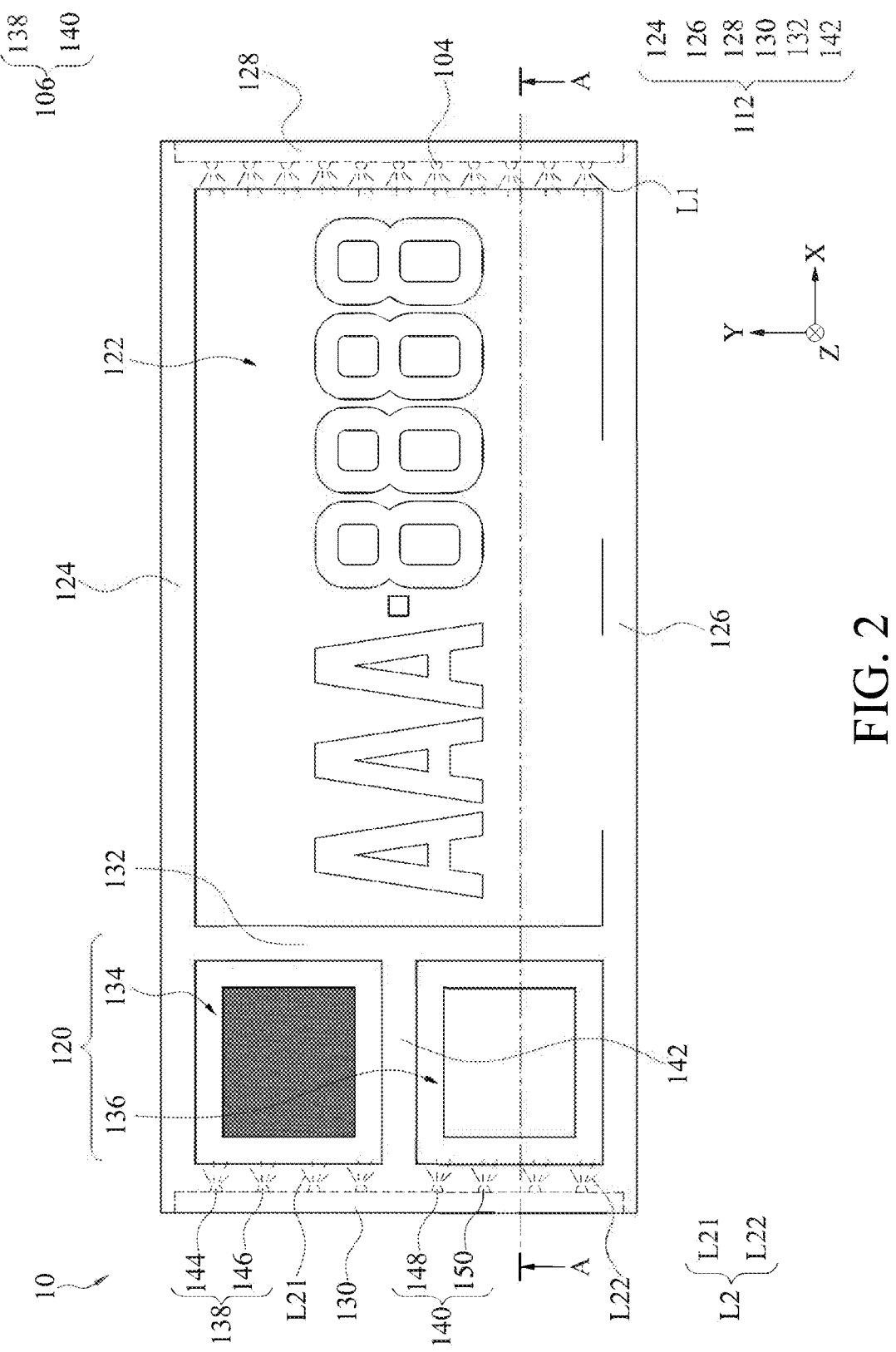
FIG. 2 is a front view of a smart license plate in some embodiments according to the present invention.
Figure 3:
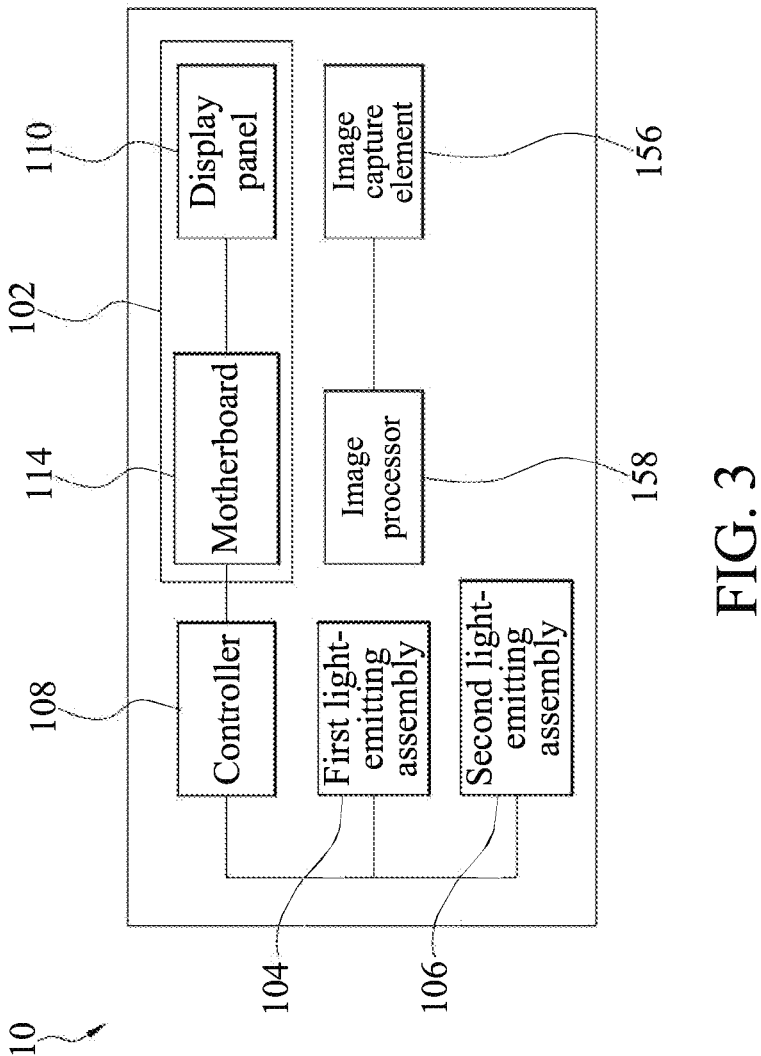
FIG. 3 is a schematic block diagram of a circuit of a smart license plate in some embodiments according to the present invention.

Refer to FIGS. 1, 2 and 3. FIG. 1 is a schematic three-dimensional exploded diagram of a smart license plate in some embodiments according to the present invention. FIG. 2 is a front view of a smart license plate in some embodiments according to the present invention. FIG. 3 is a schematic block diagram of a circuit of a smart license plate in some embodiments according to the present invention. As shown in FIGS. 1 to 3, a smart license plate 10 includes a display assembly 102, a first light-emitting assembly 104, a second light-emitting assembly 106, and a controller 108. The display assembly 102 includes a display panel 110, a frame 112 and a motherboard 114. The display panel 110 has a display surface 116 and a mounting surface 118. The frame 112 is connected to the display surface 116 and divides the display surface 116 into an active region 120 and a passive region 122. The motherboard 114 is connected to the mounting surface 118 and coupled to the display panel 110. The motherboard 114 drives the display panel 110 to selectively display, in the passive region 122, a license plate image I1. The first light-emitting assembly 104 corresponds to the passive region 122 to emit a first light ray L1 towards the passive region 122 when driven. The second light-emitting assembly 106 corresponds to the active region 120 to emit a second light ray L2 towards the active region 120 when driven. The controller 108 is coupled to the first light-emitting assembly 104 and the second light-emitting assembly 106, and the controller 108 selectively drives the first light-emitting assembly 104 and the second light-emitting assembly 106.

The smart license plate 10 may be installed on a vehicle (see FIG. 6a), and displays a license plate number of the vehicle and sends an optical communication signal via the display assembly 102 (as explained later). In some embodiments, the display panel 110 may be an electronic paper. Since electric power to drive the electronic paper is relatively lower than that to drive a liquid crystal display or light emitting diode display, the motherboard 114 can drive the display panel 110 at a lower voltage, thereby reducing the overall energy consumption of the display assembly 102. After the frame 112 is connected to the display surface 116, the display surface 116 is divided into an active region 120 and a passive region 122. The display panel 110 may control an image displayed in the active region 120 or the passive region 122, so that the active region 120 and the passive region 122 may display different images as needed. For example, the active region 120 and the second light-emitting assembly 106 cooperate with each other to send an optical communication signal to the display direction (a Z-axis positive value direction in FIG. 1) of the smart license plate 10, while the passive region 122 may display the license plate image I1. The license plate image I1 at least includes a license plate number, so that a vehicle host C23 (see FIGS. 6a and 6b) may recognize the license plate number from the license plate image I1 after a camera lens C22 (see FIGS. 6a and 6b) captures the license plate image I1 (as explained in FIGS. 6a and 6b later). In some embodiments, the license plate image I1 further includes an advertisement image, and the display assembly 102 may display, in the passive region 122, the advertisement image according to the startup state of the vehicle to convey a message to the outside. The advertisement image may be an image of texts and/or graphics. For example, when the vehicle is in the startup state, the license plate image I1 may only display the license plate number. When the vehicle is in a non-startup state, the license plate image I1 may display both the license plate number and the advertisement image (the advertisement image may be "vehicle stops for a while, please contact the vehicle owner" or a piece of product advertisement here). Furthermore, when installed on the vehicle, the smart license plate 10 may be directly fixed to the vehicle by the motherboard 114 or the frame 112, or the smart license plate 10 may be fixed to the vehicle by a license plate suspension bracket after the motherboard 114 or the frame 112 is installed on the license plate suspension bracket.

Figure 5:
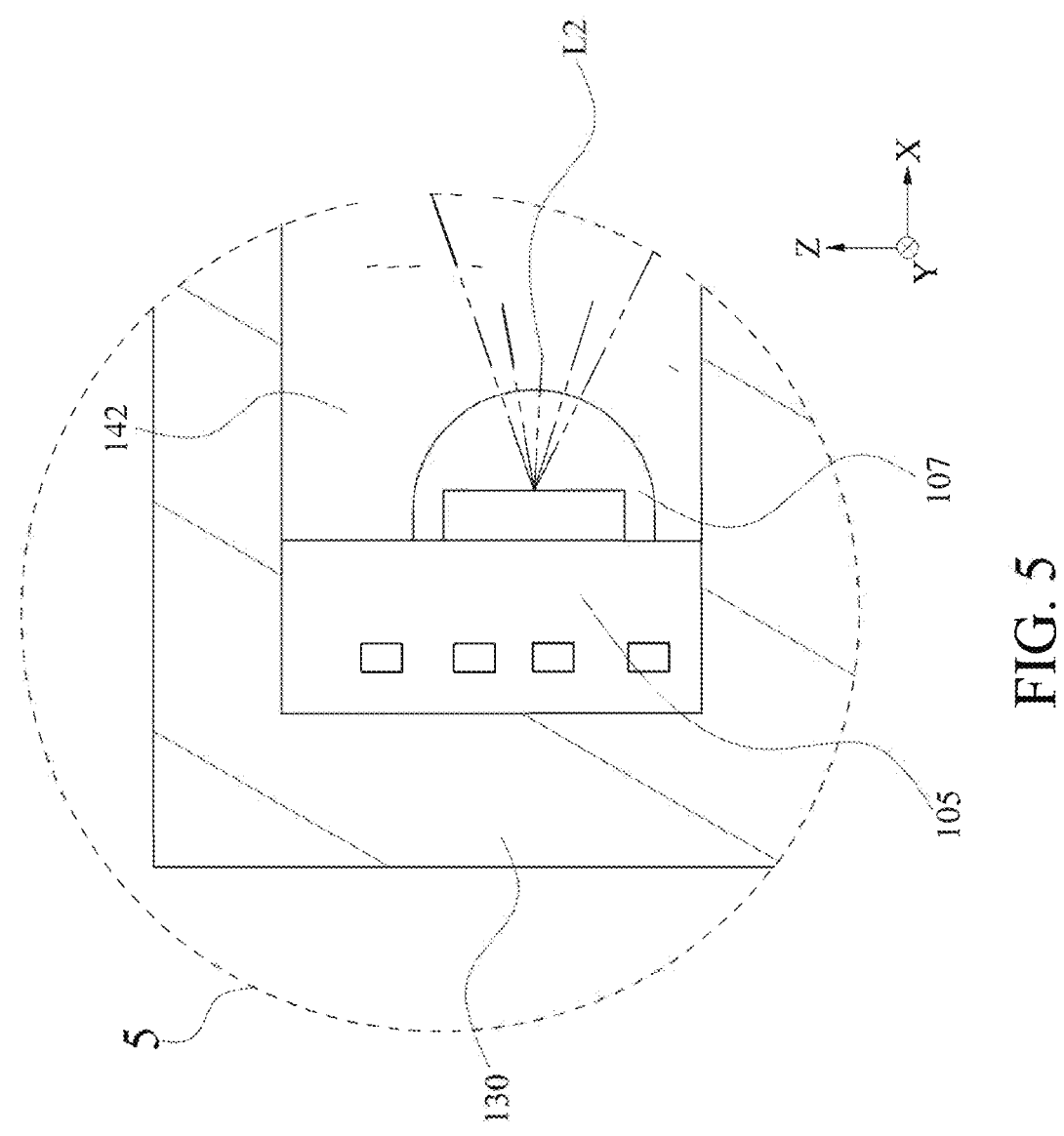
FIG. 5 is an enlarged view of a partial region in FIG. 4, showing an angle at which a second light-emitting assembly emits a second light ray.

The first light-emitting assembly 104 and the second light-emitting assembly 106 may be a light emitting diode 105 (see FIG. 5). The first light ray L1 and the second light ray L2 are each afar-infrared ray. After the controller 108 drives the first light-emitting assembly 104 and/or the second light-emitting assembly 106, the first light-emitting assembly 104 and the second light-emitting assembly 106 may emit the far-infrared rays (i.e., the first light ray L1 and the second light ray L2). The first light-emitting assembly 104 and the second light-emitting assembly 106 may be directly or indirectly connected to the frame 112. A light-emitting face of the first light-emitting assembly 104 corresponds to the passive region 122. A light-emitting face of the second light-emitting assembly 106 corresponds to the active region 120. In some embodiments, the first light-emitting assembly 104 and the second light-emitting assembly 106 may be directly fixed to the frame 112. The first light-emitting assembly 104 and the second light-emitting assembly 106 may also be detachably connected to the frame 112 by a connecting member (such as a fastening piece, a screw or a catch block). In some embodiments, the first light-emitting assembly 104 and the second light-emitting assembly 106 may be arranged on the frame 112 in the Y-axis direction of FIG. 1, or arranged on the frame 112 in the X-axis direction of FIG. 1. That is, the second light ray L2 may irradiate upon the active region 120 in the X-axis or Y-axis direction as shown in FIG. 1. The first light ray L1 may irradiate upon the passive region 122 in the X-axis or Y-axis direction as shown in FIG. 1.

The frame 112 may be made of metal, plastic, rubber and other materials, and the frame 112 may block the light rays. The frame 112 may be directly or indirectly connected to the display surface 116. For example, the frame 112 may be directly fixed to the display surface 116 by a rivet or an adhesive, so that the frame 112 is normally fixed to the display surface 116. For another example, the frame 112 may be detachably connected to the display surface 116 by a fastening structure, a locking element (such as a screw set), a magnetic element or other connecting member. If the frame 112, the first light-emitting assembly 104, or the second light-emitting assembly 106 are damaged, a damaged element may be replaced individually.

The motherboard 114 may drive and control the display panel 110, so that the active region 120 and passive region 122 of the display surface 116 may both display corresponding images. In some embodiments, the motherboard 114 may also be electrically connected (wireless connection or wired connection) to the vehicle host C23. The vehicle host C23 may transmit vehicle registration information or push information to the motherboard 114. The motherboard 114 is made to decode and/or encode the vehicle registration information or push information. An encoded signal is transmitted to the display panel 110. The display panel 110 may selectively (normally or transiently) display the license plate image I1 (including the license plate number and/or advertisement image). The vehicle registration information may include one or a combination of at least two or more of the license plate number, vehicle owner information and vehicle information. In some embodiments, the motherboard 114 may be an electronic paper motherboard, such that the motherboard 114, after receiving the vehicle registration information or push information, may process the vehicle registration information or push information into an image signal that can be displayed on the electronic paper. In some embodiments, the motherboard 114 may include a display control module. The display control module includes such as a control circuit, a drive circuit, an electric power transmission circuit and a signal transmission circuit, such that the motherboard 114 can drive and control the display panel 110.

The controller 108 may be, for example, a central processing unit (CPU), a microcontroller or a circuit board. As such, in some embodiments, the controller 108 may be an independent circuit board or an element disposed on the motherboard 114. The controller 108 mentioned above selectively drives the first light-emitting assembly 104 and the second light-emitting assembly 106.

Taking driving the first light-emitting assembly 104 as an example, the controller 108 may drive the first light-emitting assembly 104 according to ambient light illumination. In a case where the ambient light illumination is insufficient and the camera lens C22 (see FIGS. 6*a* and 6*b*) cannot clearly shoot the license plate number, the controller 108 may drive the first light-emitting assembly 104 to irradiate upon the passive region 122 with the first light ray L1. After the passive region 122 is irradiated upon with the first light ray L1, the brightness of the passive region 122 can be increased, and the vehicle host C23 can recognize the license plate number in the passive region 122. Conversely, the controller 108 may turn off the first light-emitting assembly 104 in a case where the ambient light illumination is sufficient to save electric power. It may also be that the controller 108 selectively drives the first light-emitting assembly 104 in a vehicle started state. For example, the controller 108 may detect an ambient brightness. When the ambient brightness under a value and the clear license plate number cannot be captured, the controller 108 drives the first light-emitting assembly 104 according to the ambient brightness. Alternatively, when the ambient brightness is sufficient to shoot the clear license plate number, the controller 108 does not drive the first light-emitting assembly 104 according to the ambient brightness. The controller 108 may be coupled to a light sensor (not illustrated in the figure). The light sensor may detect the ambient light illumination and generate a light detection signal. The controller 108 may driver (turn on or turn off) the first light-emitting assembly 104 according to the light detection signal. In some embodiments, the light sensor can also be directly integrated into the controller 108.

Taking driving the second light-emitting assembly 106 as an example, the controller 108 drives the second light-emitting assembly 106 to irradiate upon the active region 120 with the second light ray L2. The controller 108 may control the emission frequency and period of the second light ray L2, such that the second light ray L2 within a preset period may be formed into a set of defined optical communication signals. Furthermore, when the external camera lens C22 (see FIGS. 6*a* and B) captures an image including the second light ray L2, the vehicle host C23 (see FIGS. 6*a* and 6*b*) may decode the image into a user-defined optical communication decoded code. In some embodiments, the controller 108 may be coupled to the motherboard 114, so that the controller 108 may obtain the real-time state of the active region 120 to control the second light-emitting assembly 106. In some embodiments, the time for the controller 108 to drive the second light-emitting assembly 106 is essentially 0.5 to 1 microsecond. The time for driving the second light-emitting assembly 106 may refer to the time when the second light-emitting assembly 106 emits the second light ray L2 (i.e., the time when the second light ray L2 irradiates upon the active region 120). The second light ray L2 is in this time range, and the external camera lens C22 has enough time to completely capture the second light ray L2 in the active region 120 (i.e., the optical communication signal composed of the second light ray L2).

Figure 4:
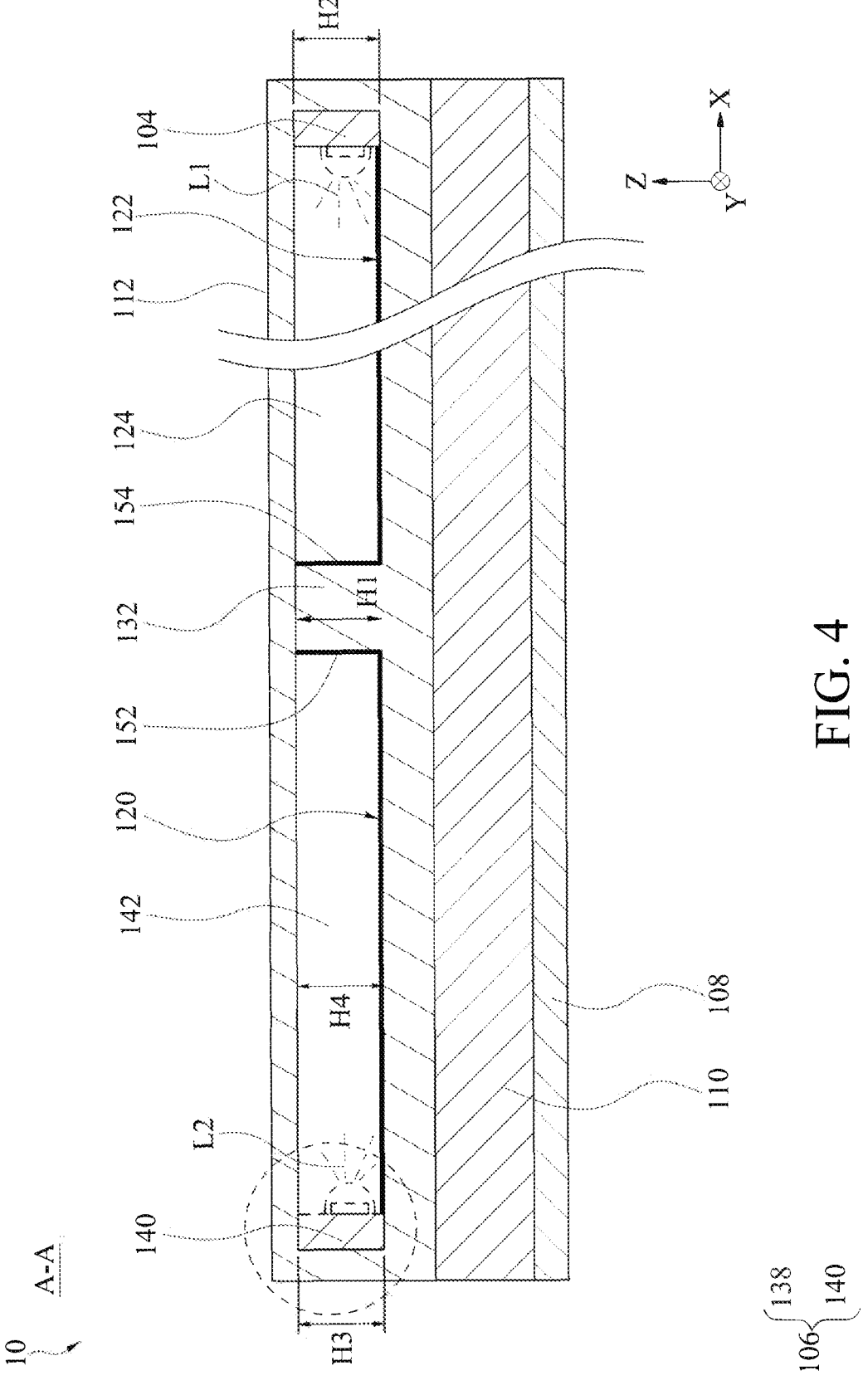
FIG. 4 is a cross-sectional view of FIG. 2 at position A-A.

As shown in FIG. 2 again, in some embodiments, the frame 112 includes a first edge strip 124, a second edge strip 126, a third edge strip 128, a fourth edge strip 130 and a first division strip 132. The first edge strip 124, the second edge strip 126, the third edge strip 128 and the fourth edge strip 130 sequentially connect in sequence and surround the display surface 116. The first division strip 132 connects to the first edge strip 124 and the second edge strip 126, and divides the display surface 116 into the active region 120 and the passive region 122. In this embodiment, the active region 120 and the passive region 122 are divided by the first division strip 132. The first division strip 132 may block the first light ray L1 and the second light ray L2, such that the first light ray L1 and the second light ray L2 do not interfere with each other. Specifically, when the first light-emitting assembly 104 emits the first light ray L1, the first light ray L1 irradiates towards the passive region 122 (the first light ray L1 irradiates towards the X-axis negative value direction in FIG. 2). A part of the first light ray L1 irradiates upon the first division strip 132, and the first division strip 132 may block the first light ray L1, such that the first light ray L1 does not enter the active region 120. Correspondingly, when the second light-emitting assembly 106 emits the second light ray L2, the second light ray L2 irradiates towards the active region 120. A part of the second light ray L2 irradiates upon the first division strip 132 (the second light ray L2 irradiates towards the X-axis positive value direction in FIG. 2), and the first division strip 132 may block the second light ray L2, such that the second light ray L2 does not enter the passive region 122. FIG. 4 is a cross-sectional view of FIG. 2 at position A-A. In some embodiments, as shown in FIG. 4, the height H1 of the first division strip 132 is essentially equal to the height H2 of the first light-emitting assembly 104 and the height H3 of the second light-emitting assembly 106. Since the height of the first division strip 132 is essentially equal to those of the first light-emitting assembly 104 and the second light-emitting assembly 106, the first division strip 132 may block the first light ray L1 and the second light ray L2. In some embodiments, the height H1 of the first division strip 132 may also be greater than the height H2 of the first light-emitting assembly 104 and the height H3 of the second light-emitting assembly 106 to ensure that the first light ray L1 and the second light ray L2 do not interfere with each other. In some embodiments, the height H1 of the first division strip 132 may be, for example, 2 mm (millimeters).

In some embodiments, the aforementioned "the first light-emitting assembly 104 corresponds to the passive region 122" and "the second light-emitting assembly 106 corresponds to the active region 120" may refer to the first light-emitting assembly 104 connected to any one or several edges of the first edge strip 124, the second edge strip 126, the third edge strip 128 and the first division strip 132, and corresponding to the passive region 122, and the second light-emitting assembly 106 connected to any one or several edges of the first edge strip 124, the second edge strip 126, the fourth edge strip 130 and the first division strip 132, and corresponding to the active region 120. As such, the first light-emitting assembly 104 can be arranged on the same edge or different edges of the frame 112, and the first light ray L1 can irradiate towards the position of the passive region 122. Similarly, the second light-emitting assembly 106 can be arranged on the same edge or different edges of the frame 112, and the second light ray L2 can irradiate towards the position of the active region 120.

Refer to FIG. 5. FIG. 5 is an enlarged view of a partial region in FIG. 4, showing an angle at which a second light-emitting assembly emits a second light ray. In some embodiments, the first light-emitting assembly 104 and the second light-emitting assembly 106 each include a plurality of light emitting diodes 105 and a plurality of lenses 107. Each lens 107 is disposed corresponding to the respective light emitting diode 105 and to focus a light ray (the first light ray L1 or the second light ray L2) emitted by the corresponding light emitting diode 105. The focus range of the lens 107 may be, for example, 30 degrees, that is, the light-emitting angle of each light emitting diode 105 after focusing is 30 degrees. When the first light ray L1 and the second light ray L2 are focused at 30 degrees, the first light ray L1 and the second light ray L2 can irradiate on the active region 120 or passive region 122 in a concentration manner, thereby improving the brightness of the active region 120 or passive region 122.

As shown in FIG. 2 again, in some embodiments, the frame 112 further divides the active region 120 into a first sub-region 134 and a second sub-region 136. The second light-emitting assembly 106 includes a first sub-assembly 138 and a second sub-assembly 140. The second light ray L2 includes a first sub-light ray L21 and a second sub-light ray L22. The first sub-assembly 138 is disposed corresponding to the first sub-region 134 to emit the first sub-light ray L21 towards the first sub-region 134 when driven. The second sub-assembly 140 is disposed corresponding to the second sub-region 136 to emit the second sub-light ray L22 to the second sub-region 136 when driven. The controller 108 selectively drives the first sub-assembly 138 and the second sub-assembly 140. The first sub-assembly 138 and the second sub-assembly 140 may be, for example, a far-infrared ray light emitting diode. In some embodiments, the controller 108 may selectively drive the first sub-assembly 138 and the second sub-assembly 140 according to images displayed in the first sub-region 134 and the second sub-region 136. As shown in FIG. 2 again, the first sub-light ray L21 irradiates towards the first sub-region 134, and the frame 112 can block the first sub-light ray L21, such that the first sub-light ray L21 does not irradiate upon the second sub-region 136. The frame 112 can also block the second sub-light ray L22, such that the second sub-light ray L22 does not irradiate upon the first sub-region 134.

As shown in FIGS. 2 and 4 again, in some embodiments, the frame 112 further includes a second division strip 142. The second division strip 142 connects to the fourth edge strip 130 and the first division strip 132 to divide the active region 120 into the first sub-region 134 and the second sub-region 136. Specifically, when the first sub-assembly 138 is driven to generate the first sub-light ray L21, the first sub-light ray L21 irradiates towards the first sub-region 134. A part of the first sub-light ray L21 does irradiate upon the second division strip 142, and the second division strip 142 can block the first sub-light ray L21, such that the first sub-light ray L21 does not enter the second sub-region 136. Correspondingly, when the second sub-assembly 140 is driven to generate the second sub-light ray L22, the second sub-light ray L22 irradiates towards the second sub-region 136. A part of the second sub-light ray L22 irradiates upon the second division strip 142, and the second division strip 142 can block the second sub-light ray L22, such that the second sub-light ray L22 does not enter the first sub-region 134.

As shown in FIG. 4 again, in some embodiments, the height H4 of the second division strip 142 is essentially equal to the height H3 of the second light-emitting assembly 106. In this embodiment, since the height of the second division strip 142 is essentially equal to that of the second light-emitting assembly 106, the second division strip 142 may block the second light ray L2. The height H4 of the second division strip 142 may also be larger than the height H3 of the second light-emitting assembly 106, thereby increasing the shielding height of the second division strip 142. In some embodiments, the height H4 of the second division strip 142 may be 2 mm (millimeters).

Figures 6A, 6B:
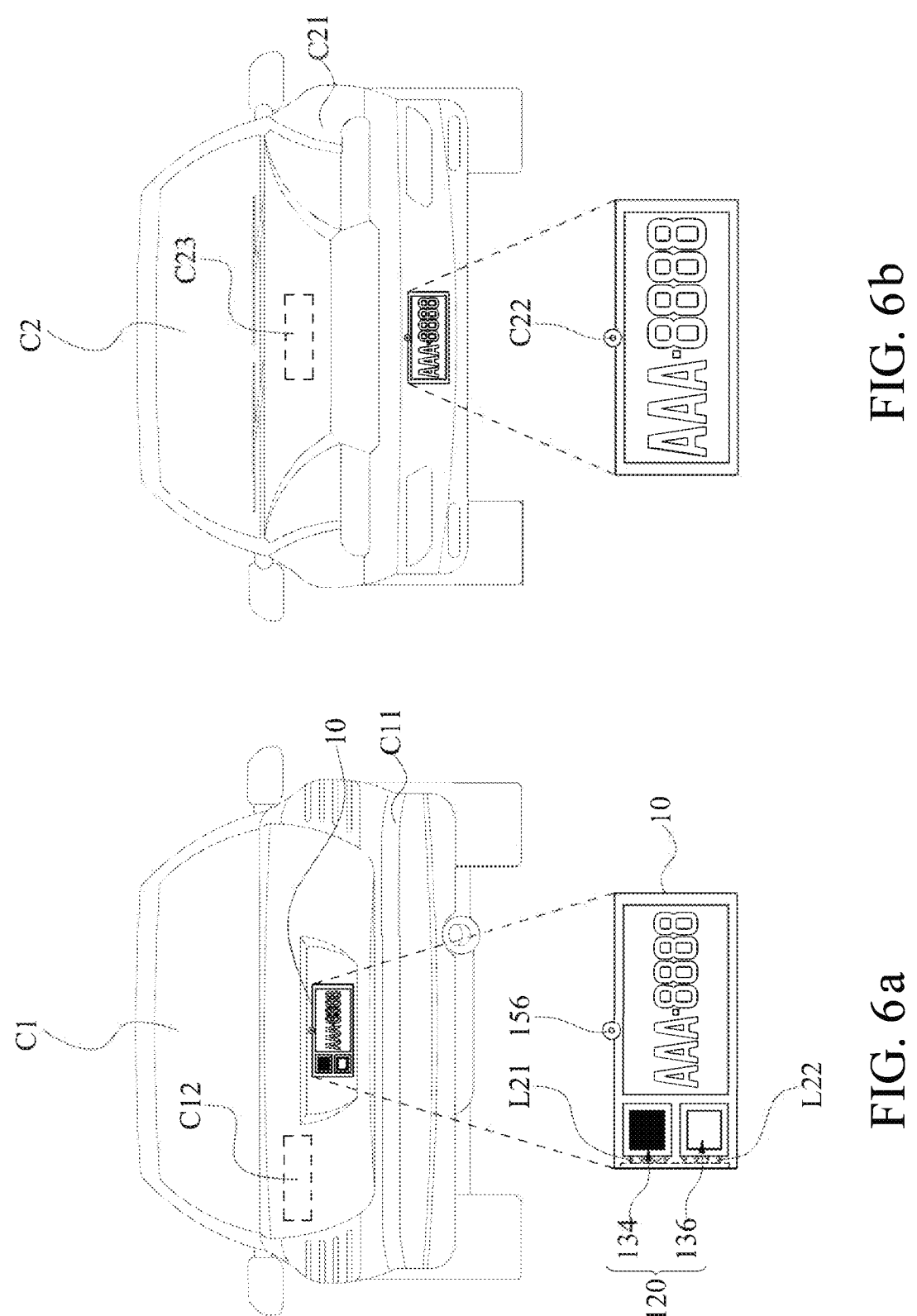
FIGS. 6a and 6b are schematic diagrams of a smart license plate of a front vehicle shot by a rear vehicle in some embodiments according to the present invention.
Figures 7A, 7B, 7C:
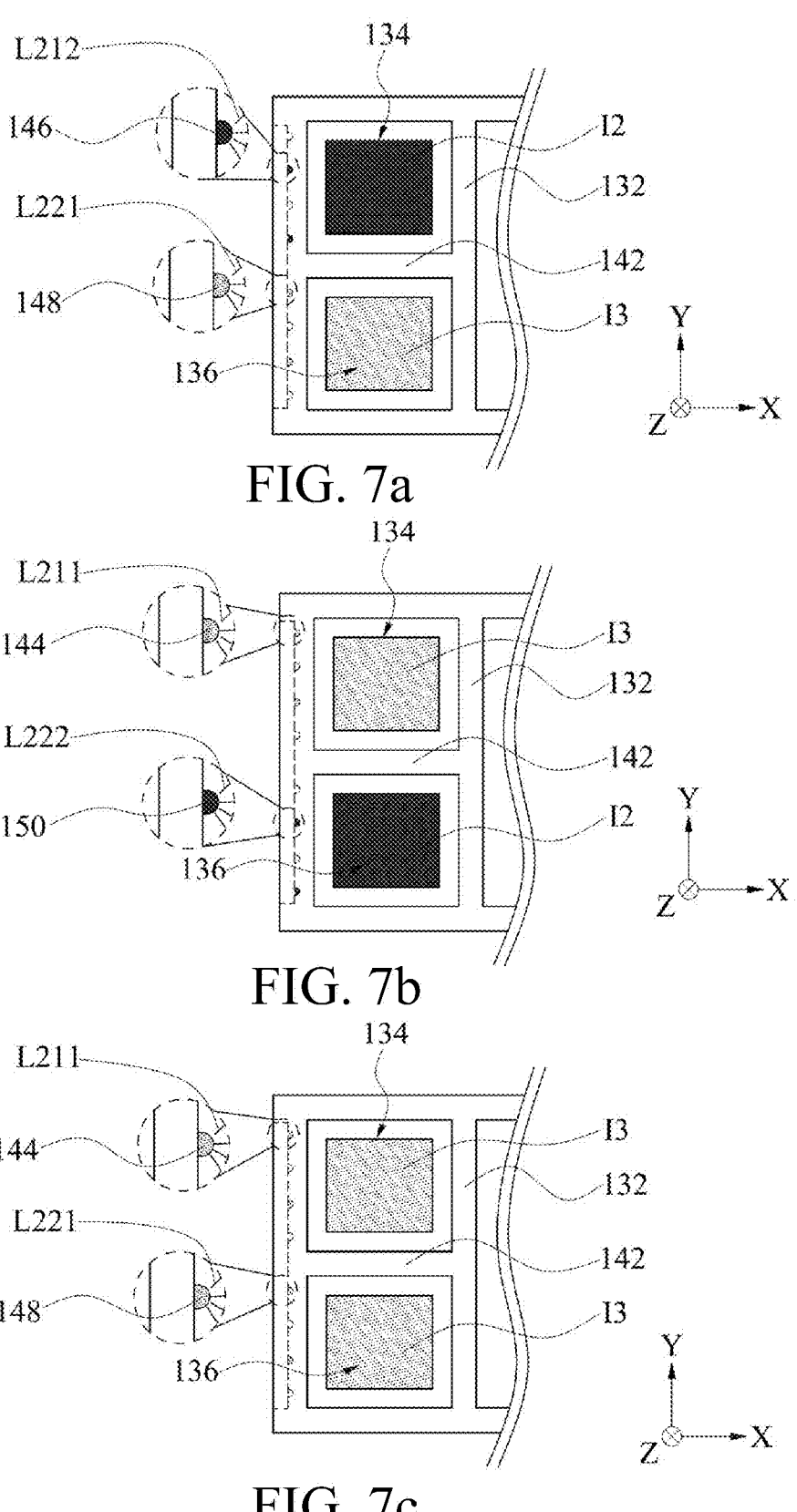
FIG. 7a is a schematic diagram of a second sub-assembly when actuated, with a first sub-region being a dark-state image and a second sub-region being a bright-state image in some embodiments according to the present invention.
FIG. 7b is a schematic diagram of a first sub-assembly when actuated, with a first sub-region being a bright-state image and a second sub-region being a dark-state image in some embodiments according to the present invention.
FIG. 7c is a schematic diagram of a first sub-assembly and a second sub-assembly when actuated, with a first sub-region and a second sub-region being both a bright-state image in some embodiments according to the present invention.

Refer to FIGS. 2, 7a, 7b and 7c together. FIG. 7a is a schematic diagram of a second sub-assembly when actuated, with a first sub-region being a dark-state image and a second sub-region being a bright-state image in some embodiments according to the present invention. FIG. 7b is a schematic diagram of a first sub-assembly when actuated, with a first sub-region being a bright-state image and a second sub-region being a dark-state image in some embodiments according to the present invention. FIG. 7c is a schematic diagram of a first sub-assembly and a second sub-assembly when actuated, with a first sub-region and a second sub-region being both a bright-state image in some embodiments according to the present invention. In some embodiments, the motherboard 114 drives the display panel 110 according to a broadcast information, and the controller 108 drives the second light-emitting assembly 106 according to the broadcast information to emit the second light ray L2. The second light ray L2 selectively irradiates upon the first sub-region 134 and the second sub-region 136 to form an optical communication signal. Specifically, the vehicle host C23 (see FIGS. 6a and 6b) can generate the broadcast information in response to a driving state, where the driving state may refer to the vehicle host C23 generating a driving state signal according to the state of the vehicle during driving (such as vehicle positioning, an adaptive cruise control (ACC) state, a road traffic signal display state or distance from a front vehicle). Corresponding the broadcast information is generated in different driving states. For example, through a position where the second light ray L2 irradiates upon the first sub-region 134 and/or the second sub-region 136, the smart license plate 10 makes the second light ray L2 emitted towards the outside of the display panel 110 form a difference in light-emitting positions to compile the broadcast information into an optical communication signal. When capturing the broadcast information sent via optical communications, other vehicles can decode the broadcast information to obtain an optical communication decoded code. By doing so, surrounding vehicles can exchange driving states with each other to assist in autonomous driving operations or construct a short-distance (a distance from which the second light ray L2 can be captured) Internet of Vehicles with the smart license plate 10 (the examples of decoding the optical communication signal are shown in FIGS. 7a to 7c).

In some embodiments, the motherboard 114 drives the display panel 110 to selectively display one of a dark-state image 12 and a bright-state image 13 in the first sub-region 134 and the second sub-region 136, respectively, the second light ray L2 selectively irradiates upon the first sub-region 134 and the second sub-region 136 to form an optical communication signal. For example, the first sub-region 134 and the second sub-region 136 only display the dark-state image 12, the first sub-region 134 and the second sub-region 136 only display the bright-state image 13, or one of the first sub-region 134 and the second sub-region 136 displays the dark-state image 12 and the other one displays the bright-state image 13. Thus, the second light ray L2 is made to form the difference in the light-emitting positions and brightness, so that the optical communication signal can be more easily recognized.

In some embodiments, the first sub-assembly 138 includes a first long-wave assembly 144 and a first short-wave assembly 146. The second sub-assembly 140 includes a second long-wave assembly 148 and a second short-wave assembly 150. The first long-wave assembly 144 and the first short-wave assembly 146 emit a first long-wave light ray L211 and a first short-wave light ray L212 respectively when driven. The second long-wave assembly 148 and the second short-wave assembly 150 emit a second long-wave light ray L221 and a second short-wave light ray L222 respectively when driven, the wavelength of the first long-wave light ray L211 is longer than that of the first short-wave light ray L212. The wavelength of the second long-wave light ray L221 is longer than that of the second short-wave light ray L222. In some embodiments, the wavelength of the first long-wave light ray L211, the wavelength of the first short-wave light ray L212, the wavelength of the second long-wave light ray L221, the wavelength of the second short-wave light ray L222 and the wavelength of the first light ray L1 are selected from the group consisting of 940 nm (nanometers), 1100 nm, 1200 nm, 1340 nm, 1480 nm and 1550 nm respectively. By way of example, the smart license plate 10 sends out the optical communication signal by the second light ray L2 irradiating upon the first sub-region 134 and/or the second sub-region 136. In order to enable the camera lens C22 to distinguish the light intensity differences, long-wave light of 1100 nm can be selected for the wavelength of the first long-wave light ray L211 and the wavelength of the second long-wave light ray L221. Correspondingly, short-wave light of 940 nm can be selected for the wavelength of the first short-wave light ray L212 and the wavelength of the second short-wave light ray L222. The wavelength of the long-wave light (the first long-wave light ray L211 and the second long-wave light ray L221) may be significantly different from that of the short-wave light (the first short-wave light ray L212 and the second short-wave light ray L222). The vehicle host C23 can also generate a corresponding digital signal according to the difference in light wavelength (as explained later).

In some embodiments, light with one or two or more of the aforementioned wavelengths can be selected for the first light-emitting assembly 104. For example, the first light-emitting assembly 104 can be configured with light with wavelengths of 940 nm and 1550 nm, and the motherboard 114 can selectively drive light with an appropriate wavelength according to the ambient illumination. For example, when the ambient illumination is good, the motherboard 114 can drive the first light-emitting assembly 104 with a wavelength of 940 nm, and the license plate image I1 can be clearly captured by the external camera lens C22 under the irradiation of the light with the wavelength of 940 nm. When the ambient illumination is poor, the motherboard 114 can drive the first light-emitting assembly 104 at 1550 nm. Under the irradiation of the light with the wavelength of 1550 nm, the license plate image I1 can still be clearly captured by the external camera lens C22 even if the ambient illumination is poor.

Refer to FIGS. 6*a* and 6*b* together. FIGS. 6*a* and 6*b* are schematic diagrams of a smart license plate of a front vehicle shot by a rear vehicle in some embodiments according to the present invention. The smart license plate 10 aforementioned sends out the optical communication signal by the second light ray L2 irradiating upon the first sub-region 134 and/or the second sub-region 136. As shown in FIG. 6*a*, the smart license plate 10 is installed on a rear C11 of a first vehicle C1. The controller 108 drives the first sub-assembly 138 and the second sub-assembly 140 according to the broadcast information (which may be a text message, a control command or an image message) to emit the first sub-light ray L21 and the second sub-light ray L22 in the first sub-region 134 and/or the second sub-region 136, respectively. The first sub-light ray L21 and the second sub-light ray L22 form an optical communication signal that can be decoded. As shown in FIG. 6*b* again, a camera lens C22 is installed on a front C21 of a second vehicle C2. When the second vehicle C2 drives behind the first vehicle C1, the camera lens C22 can capture the optical communication signal sent by the active region 120 (i.e., the first sub-light ray L21 and the second sub-light ray L22) and generate image information. After a vehicle host C23 of the second vehicle C2 executes an image analysis procedure, the image information can be identified and analyzed to obtain the optical communication signal and the broadcast information. In some embodiments, it may also be that a lens provided on the road to capture and analyze the optical communication signal. It should be noted that the smart license plate 10 can also be installed on the front of the first vehicle C1, while the camera lens C22 of the second vehicle C2 can be installed on the rear of the second vehicle C2.

Refer to FIGS. 2, 6*a*, 6*b*, 7*a*, 7*b* and 7*c*. The motherboard 114 drives the display panel 110 to selectively display a dark-state image 12 and a bright-state image 13 in the first sub-region 134, or can drive the display panel 110 to selectively display the dark-state image 12 and the bright-state image 13 in the second sub-region 136. When the first sub-region 134 displays the dark-state image 12, the controller 108 drives the first short-wave assembly 146. When the first sub-region 134 displays the bright-state image 13, the controller 108 drives the first long-wave assembly 144. When the second sub-region 136 displays the dark-state image 12, the controller 108 drives the second short-wave assembly 150. When the second sub-region 136 displays the bright-state image 13, the controller 108 drives the second long-wave assembly 148. In some embodiments, the optical communication signal aforementioned may be a binary digit signal encoded code (a high-bit signal and a low-bit signal can be represented by 0 or 1). It is illustrated below with explaining encoding of the optical communication signal in FIGS. 7*a*, 7*b* and 7*c*.

As shown in FIG. 7*a*, when the first sub-region 134 displays the dark-state image 12 and the second sub-region 136 displays the bright-state image 13, the controller 108 drives the first short-wave assembly 146 and the second long-wave assembly 148. The first short-wave light ray L212 irradiates upon the dark-state image 12, and the camera lens C22 can capture a relatively dark image, while the vehicle host C23 can decode the image as a low-bit signal "1". The second long-wave light ray L221 irradiates upon the bright-state image 13, and the camera lens C22 can capture a relatively bright image, while the vehicle host C23 can decode the image as a high-bit signal "0". Based on this, in the example of FIG. 7*a*, the vehicle host C23 can obtain a digital signal encoded code of [1, 0].

As shown in FIG. 7*b*, when the first sub-region 134 displays the bright-state image 13 and the second sub-region 136 displays the dark-state image 12, the controller 108 drives the first long-wave assembly 144 and the second short-wave assembly 150. The first long-wave light ray L211 irradiates upon the bright-state image 13, and the camera lens C22 can capture a relatively bright image, while the vehicle host C23 can decode the image as a high-bit signal "0". The second short-wave light ray L222 irradiates upon the dark-state image 12, and the camera lens C22 can capture a relatively dark image, while the vehicle host C23 can decode the image as a low-bit signal "1". Based on this, in the example of FIG. 7*b*, the vehicle host C23 can obtain a digital signal encoded code of [0, 1].

As shown in FIG. 7*c*, when the first sub-region 134 and the second sub-region 136 both displays the bright-state image 13, the controller 108 drives the first long-wave assembly 144 and the second long-wave assembly 148. The first long-wave light ray L211 irradiates upon the bright-state image 13, and the camera lens C22 can capture a relatively bright image, while the vehicle host C23 can decode the image as a high-bit signal "0". The second long-wave light ray L221 irradiates upon the bright-state image 13, and the camera lens C22 can capture a relatively bright image, while the vehicle host C23 can decode the image as a high-bit signal "0". Based on this, in the example of FIG. 7c, the vehicle host C23 can obtain a digital signal encoded code of [0, 0].

Thereby, according to the examples of FIGS. 7a, 7b and 7c, the controller 108 drives the corresponding first long-wave assembly 144, first short-wave assembly 146, second long-wave assembly 148 or second short-wave assembly 150 according to the dark-state image 12 or bright-state image 13 displayed in the first sub-region 134 and the second sub-region 136, such that different light intensity differences are generated between the dark-state image 12 and the bright-state image 13 under the irradiation of light with different wavelengths. The recognition of different light wavelength signals by the vehicle host C23 is improved, and the accuracy of optical communication signal decoding is improved.

As shown in FIGS. 2 and 4 again, in some embodiments, the frame 112 further includes a first light guide plate 152. The first light guide plate 152 is disposed corresponding to the active region 120 to guide the second light ray L2 towards the active region 120. The first light guide plate 152 can be provided on the surfaces/surface of the first edge strip 124, the fourth edge strip 130, the first division strip 132 and/or the second division strip 142 that surround the active region 120 (in FIG. 4, the first light guide plate 152 is provided on the first division strip 132). When the second light ray L2 irradiates upon the first light guide plate 152, the first light guide plate 152 can guide the second light ray L2 to irradiate upon the active region 120. In some embodiments, the frame 112 further includes a second light guide plate 154. The second light guide plate 154 is disposed corresponding to the passive region 122 to guide the second light ray L1 towards the passive region 122. The second light guide plate 154 can be provided on the surfaces/surface of the first edge strip 124, the second edge strip 126, the third edge strip 128 and/or the first division strip 132 that surround the passive region 122 (in FIG. 4, the second light guide plate 154 is provided on the first division strip 132). When the first light ray L1 irradiates upon the second light guide plate 154, the second light guide plate 154 can guide the first light ray L1 to irradiate upon the passive region 122. In some embodiments, the first light guide plate 152 and the second light guide plate 154 can also be provided on the surface of the display surface 116, such that the first light ray L1 and the second light ray L2 can irradiates relative to the display surface 116 (i.e. towards the Z-axis positive value direction in FIG. 4) under the action of the reflection or diffusion of the first light guide plate 152 and the second light guide plate 154, after the first light ray L1 irradiates upon the passive region 122 and the second light ray L2 irradiates upon the active region 120. In some embodiments, the first light guide plate 152 and the second light guide plate 154 can also be a reflective film, a prism structure, or a reflective coating.

Figure 8A:
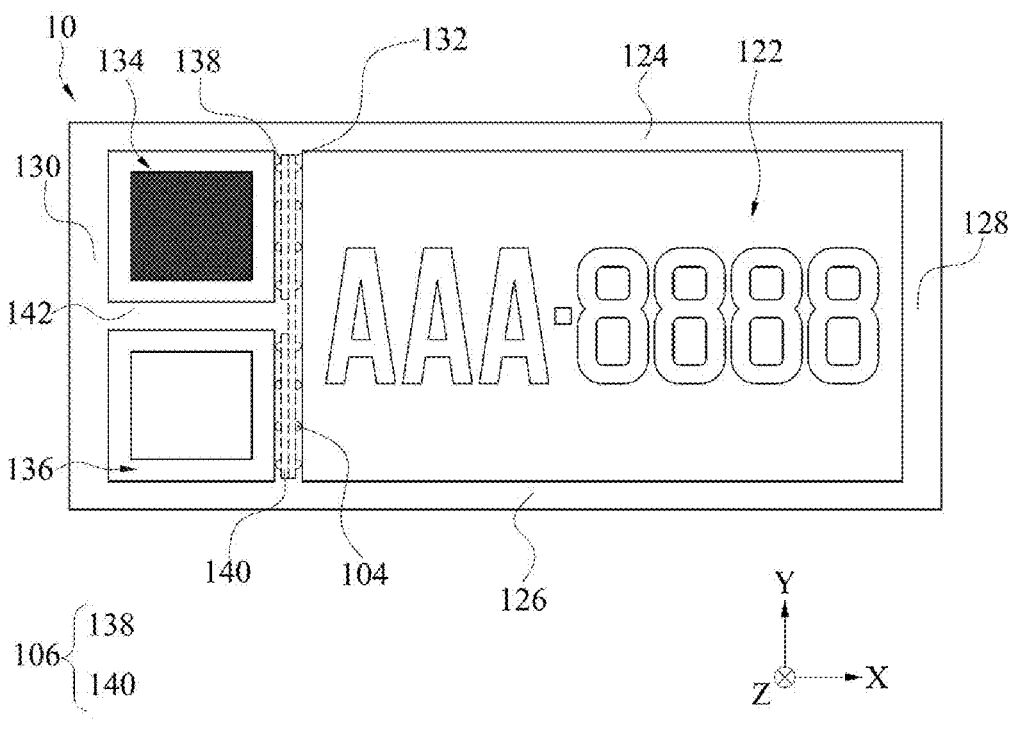
FIG. 8a is a schematic diagram of a smart license plate in some embodiments according to the present invention, showing that a first light-emitting assembly, a first sub-assembly and a second sub-assembly are arranged on a first division strip.
Figure 8B:
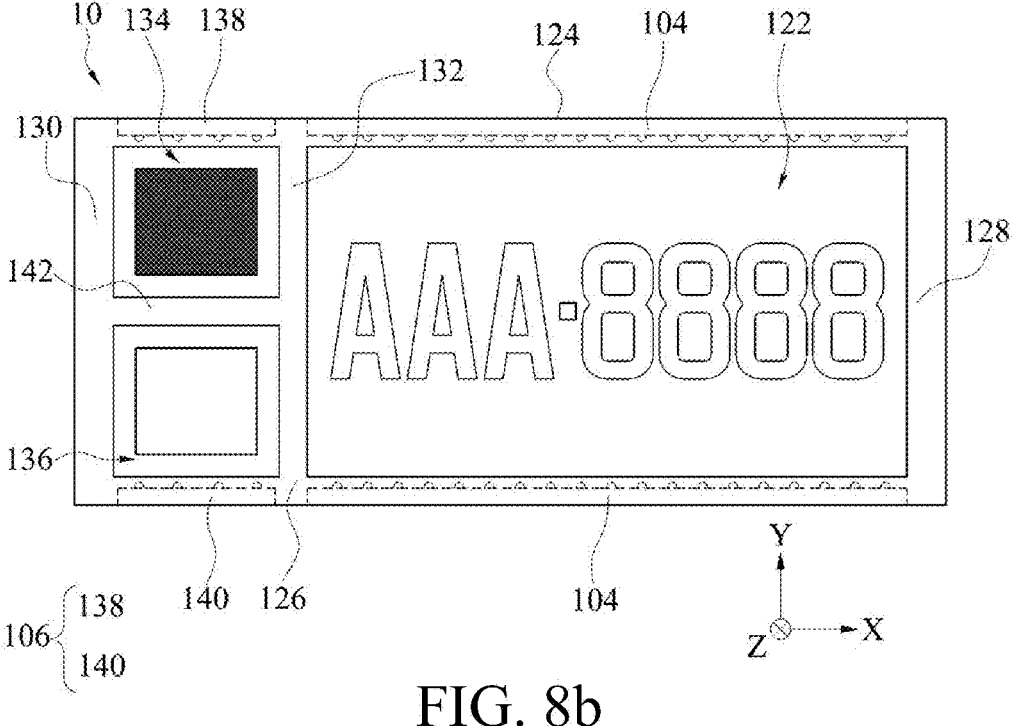
FIG. 8b is a schematic diagram of a smart license plate in some embodiments according to the present invention, showing that a first light-emitting assembly is arranged on a first edge strip and a second edge strip, a first sub-assembly is arranged on the first edge strip, and a second sub-assembly is arranged on the second edge strip.
Figure 8C:
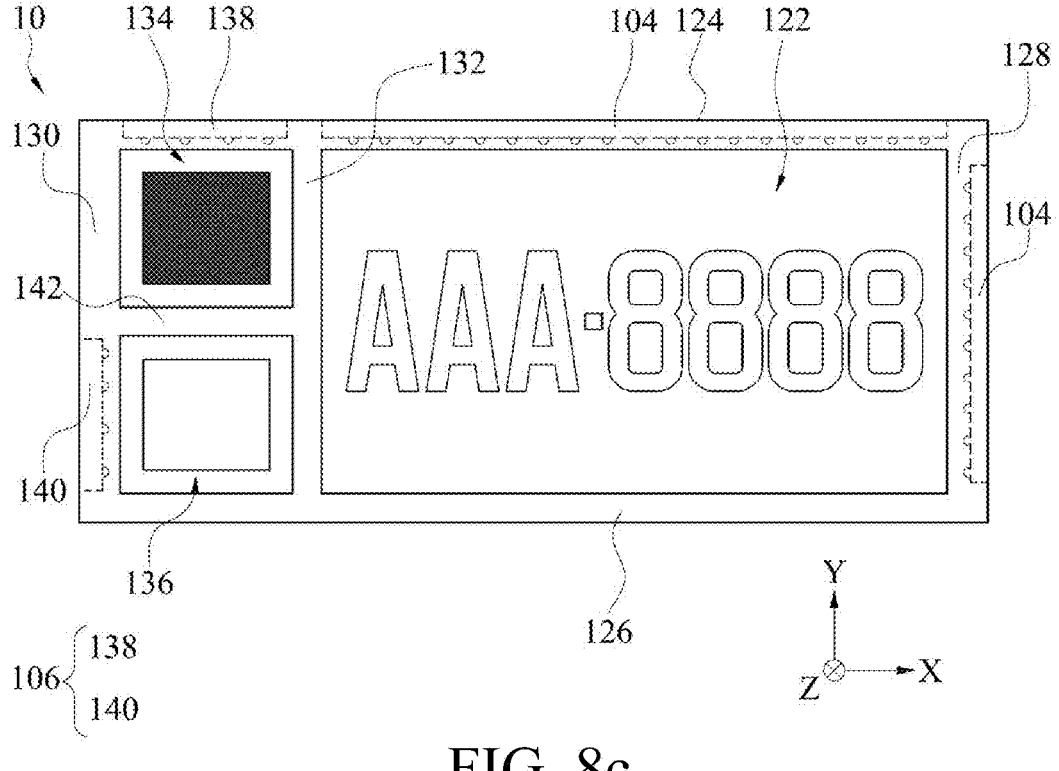
FIG. 8c is a schematic diagram of a smart license plate in some embodiments according to the present invention, showing that a first light-emitting assembly is arranged on a first edge strip and a third edge strip, a first sub-assembly is arranged on the first edge strip, and a second sub-assembly is arranged on a fourth edge strip.

Refer to FIGS. 8a, 8b and 8c. FIG. 8a is a schematic diagram of a smart license plate in some embodiments according to the present invention, showing that a first light-emitting assembly, a first sub-assembly and a second sub-assembly are arranged on a first division strip. FIG. 8b is a schematic diagram of a smart license plate in some embodiments according to the present invention, showing that a first light-emitting assembly is arranged on a first edge strip and a second edge strip, a first sub-assembly is arranged on the first edge strip, and a second sub-assembly is arranged on the second edge strip. FIG. 8c is a schematic diagram of a smart license plate in some embodiments according to the present invention, showing that a first light-emitting assembly is arranged on a first edge strip and a third edge strip, a first sub-assembly is arranged on the first edge strip, and a second sub-assembly is arranged on a fourth edge strip. In some embodiments, as shown in FIG. 8a, the aforementioned "the first light-emitting assembly 104 corresponds to the passive region 122" and "the second light-emitting assembly 106 is configured corresponding to the active region 120" may refer to the first light-emitting assembly 104 being arranged on the first division strip 132 and corresponds to the passive region 122, and the second light-emitting assembly 106 being arranged on the first division strip 132 and corresponds to the active region 120. The first sub-assembly 138 of the second light-emitting assembly 106 is configured in the first sub-region 134. The second sub-assembly 140 is configured in the second sub-region 136. In this embodiment, the emission direction (X-axis positive value direction in FIG. 8a) of the first light ray L1 is opposite to that (X-axis negative direction in FIG. 8a) of the second light ray L2, thereby avoiding interference between the first light ray L1 and the second light ray L2.

As shown in FIG. 8b again, in some embodiments, there may be a plurality of sets of first light-emitting assembly 104. The two first light-emitting assembly 104 as shown in FIG. 8b are arranged on the first edge strip 124 and the second edge strip 126, respectively (they can also be arranged on the third edge strip 128 and the first division strip 132), and correspond to the passive region 122. The first sub-assembly 138 of the second light-emitting assembly 106 is arranged on the first edge strip 124 (or can also be arranged on the second division strip 142), and corresponds to the first sub-region 134. The second sub-assembly 140 of the second light-emitting assembly 106 is arranged on the second edge strip 126 (or can also be arranged on the second division strip 142), and corresponds to the second sub-region 136.

As shown in FIG. 8c again, in some embodiments, the two first light-emitting assembly 104 are arranged on the first edge strip 124 and the third edge strip 128, respectively (they can also be arranged on the first edge strip 124 and the first division strip 132, the second edge strip 126 and the third edge strip 128, or the second edge strip 126 and the first division strip 132), and correspond to the passive region 122. The first sub-assembly 138 of the second light-emitting assembly 106 is arranged on the first edge strip 124 (or it can also be arranged on the first division strip 132, the second division strip 142 or the fourth edge strip 130), and corresponds to the first sub-region 134. The first sub-assembly 140 of the second light-emitting assembly 106 is arranged on the fourth edge strip 130 (or it can also be arranged on the second edge strip 126, the first division strip 132 or the second division strip 142), and corresponds to the second sub-region 136. The first light ray L1 of the two first light-emitting assembly 104 are emitted in different axial directions. For example, the first light-emitting assembly 104 arranged on the first edge strip 124 or the second edge strip 126 emits the first light ray L1 in the Y-axis direction in FIG. 8c, while the first light-emitting assembly 104 arranged on the third edge strip 128 or the first division strip 132 emits the first light ray L1 in the X-axis direction in FIG. 8c. Similarly, the first sub-assembly 138 arranged on the first edge strip 124 (or the second division strip 142) emits the first sub-light ray L21 in the Y-axis direction in FIG. 8c, while the second sub-assembly 140 arranged on the fourth edge strip 130 (or the first division strip 132) emits the second sub-light ray L22 in the X-axis direction in FIG. 8c. In this embodiment, even if the first sub-light ray L21 and the second sub-light ray L22 are emitted in different axial directions, the second division strip 142 can still block the first sub-light ray L21 and the second sub-light ray L22, thus avoiding that the first sub-light ray L21 enters the second sub-region 136 and the second sub-light ray L22 enters the first sub-region 134.

Figure 9:
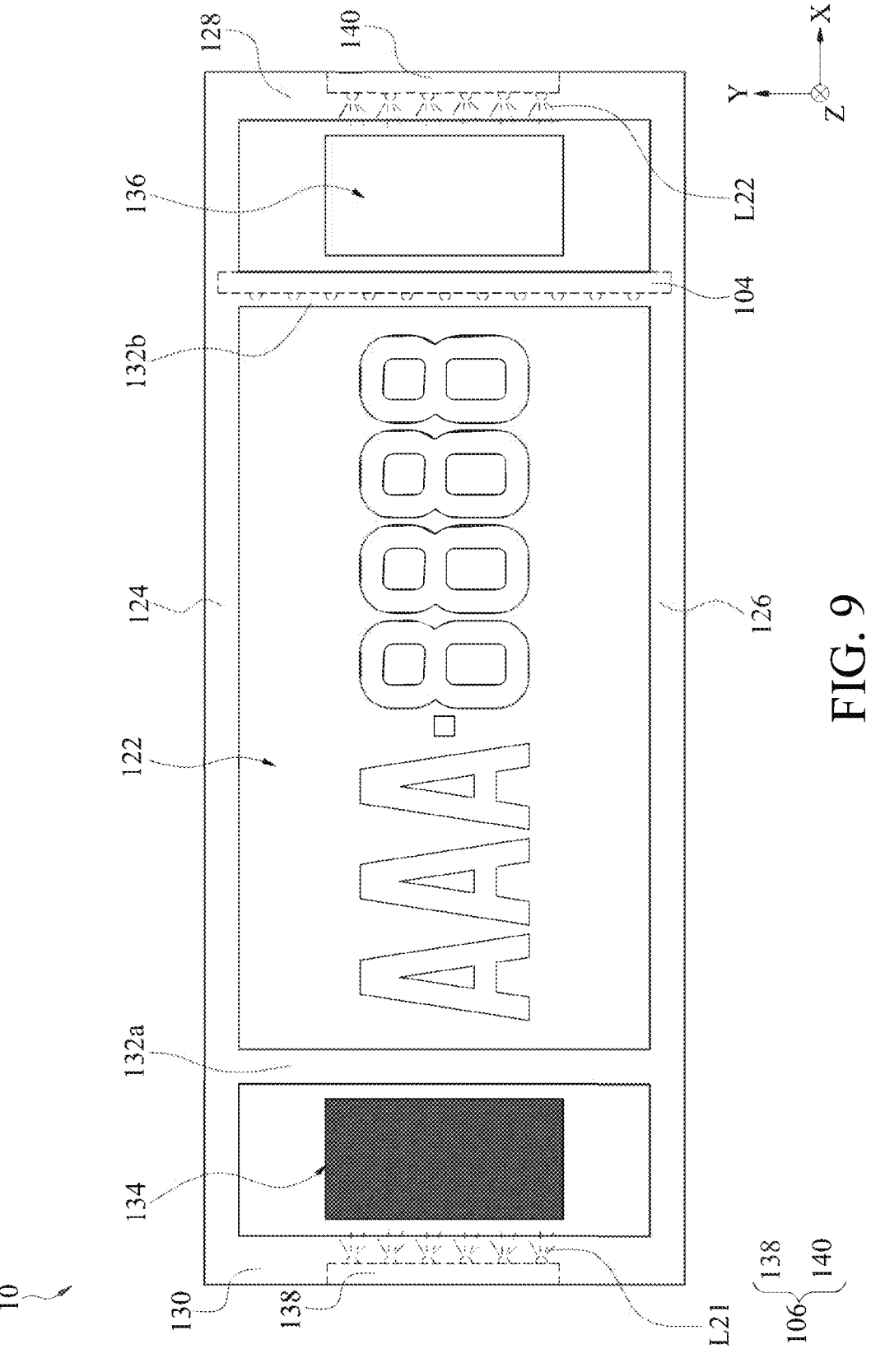
FIG. 9 is a schematic diagram of a smart license plate where a first sub-region and a second sub-region are arranged on both sides of a passive region respectively in some embodiments according to the present invention.

Refer to FIG. 9. FIG. 9 is a schematic diagram of a smart license plate where a first sub-region and a second sub-region are arranged on both sides of a passive region respectively in some embodiments according to the present invention. In some embodiments, the first sub-region 134 and the second sub-region 136 may be arranged on both sides of the passive region 122. As shown in FIG. 9, the frame 112 includes two first division strips (132a, 132b). The two first division strips (132a, 132b) are disposed on both sides of the display surface 116 respectively and connect to the first edge strip 124 and the second edge strip 126, and the two first division strips (132a, 132b) divides the display surface 116 into the active region 120 and the passive region 122. As shown in FIG. 9, the first sub-region 134 is divided from a position between the first division strip 132a and the fourth edge strip 130. The second sub-region 136 is divided from a position between the first division strip 132b and the third edge strip 128. The first sub-assembly 138 corresponds to the first sub-region 134, which can be configured in any one or any two aforementioned edges of the first edge strip 124, the second edge strip 126, the fourth edge strip 130, and the first division strip 132a. The second sub-assembly 140 corresponds to the second sub-region 136, which can be configured in any one or any two aforementioned edges of the first edge strip 124, the second edge strip 126, the third edge strip 128, and the first division strip 132b. In this embodiment, by configuring the first sub-region 134 and the second sub-region 136 on both sides of the passive region 122 to increase the distance between the first sub-region 134 and the second sub-region 136 as well as the display range of the first sub-region 134 and the second sub-region 136, the first sub-light ray L21 and the second sub-light ray L22 can be distinguished more easily in the image captured by the camera lens C22 (refer to the camera lens C22 in FIG. 6b).

Figure 10:
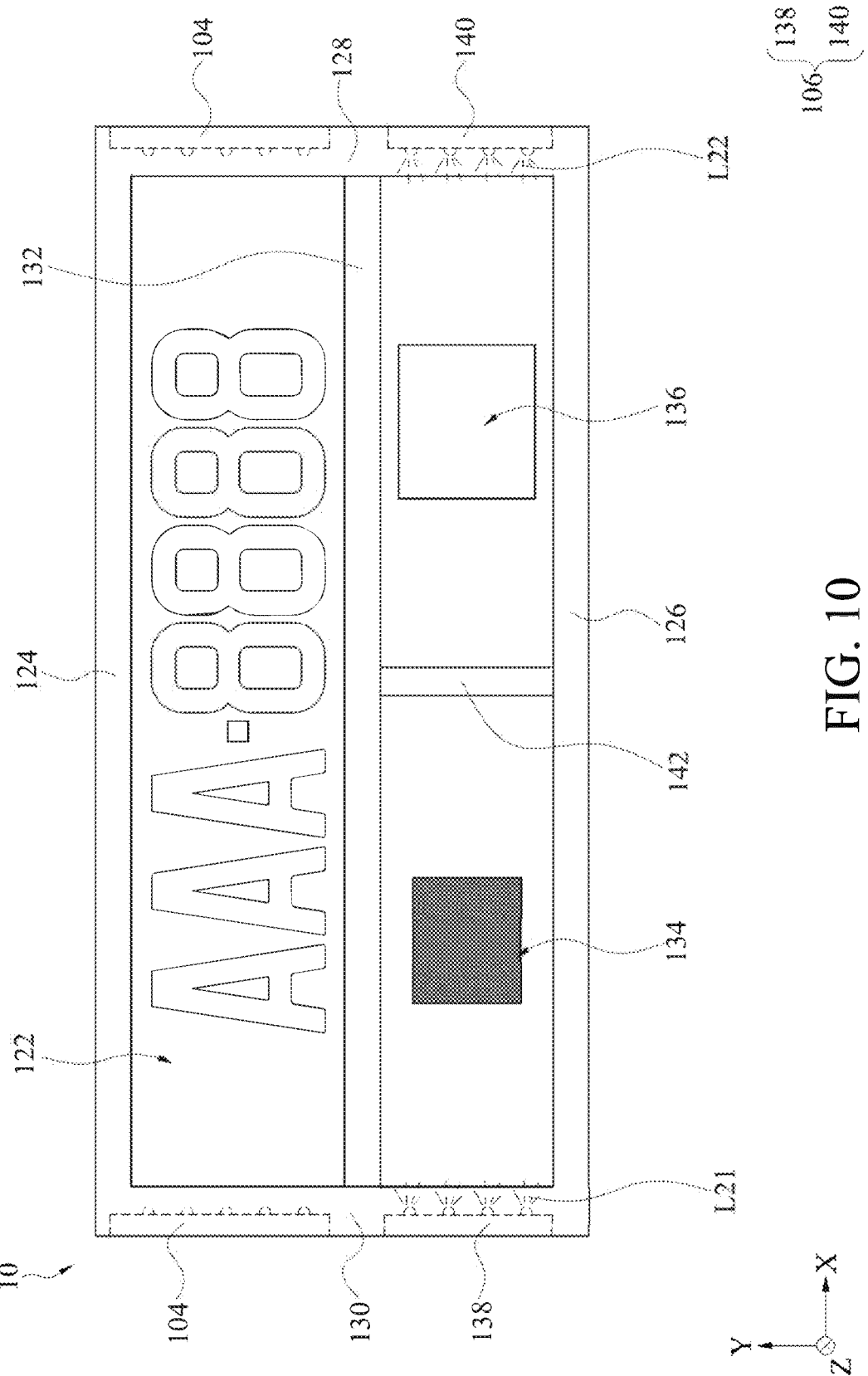
FIG. 10 is a schematic diagram of a smart license plate where a first division strip is arranged on a third edge strip and a fourth edge strip, and a second division strip is arranged on the first division strip and a second edge strip in some embodiments according to the present invention.

Refer to FIG. 10. FIG. 10 is a schematic diagram of a smart license plate where a first division strip is arranged on a third edge strip and a fourth edge strip, and a second division strip is arranged on the first division strip and a second edge strip in some embodiments according to the present invention. In some embodiments, the active region 120 and the passive region 122 can be configured in the plumb line direction (Y-axis direction in the figure). As shown in FIG. 10, the first division strip 132 is connected to the third edge strip 128 and the fourth edge strip 130, and divides the display surface 116 into the active region 120 and the passive region 122, such that the active region 120 and the passive region 122 are configured in the Y-axis direction in the figure. Furthermore, the second division strip 142 connects the first division strip 132 and the second edge strip 126 to divide the active region 120 into the first sub-region 134 and the second sub-region 136. It should be noted that the first light-emitting assembly 104 can be configured in the one or any two aforementioned edges of the first division strip 132, the first edge strip 124, the third edge strip 128 and the fourth edge strip 130. The first sub-assembly 138 of the second light-emitting assembly 106 corresponds to the first sub-region 134, which can be configured in any one or any two aforementioned edges of the first division strip 132, the second division strip 142, the second edge strip 126 and the fourth edge strip 130. The second sub-assembly 140 of the second light-emitting assembly 106 corresponds to the second sub-region 136, which can be configured in any one or any two aforementioned edges of the first division strip 132, the second division strip 142, the second edge strip 126 and the third edge strip 128. In this embodiment, by arranging the active region 120 and the passive region 122 in the plumb line direction, the first sub-region 134 and the second sub-region 136 can have a larger display range, such that the first sub-light ray L21 and the second sub-light ray L22 can be distinguished more easily in the image captured by the camera lens C22 (refer to the camera lens C22 in FIG. 6b).

As shown in FIGS. 3, 6a and 6b again, in some embodiments, the smart license plate 10 further includes an image capture element 156 and an image processor 158, wherein the image capture element 156 is adapted to capture an image, and the image processor 158 is adapted to process the image and output a communication information accordingly. Specifically, the image processor 158 is coupled to the image capture element 156. The image captured by image capture element 156 may be an image including the optical communication signal composed of the second light ray L2. The image processor 158 may perform analysis to obtain the communication information. In some embodiments, the vehicle host C12 of the first vehicle C1 provided with the smart license plate 10 can decode the communication information (such as obtaining the optical communication decoded code) or even processes the communication information. For example, when the communication information is a control command, the vehicle host C12 can execute this control command. When the communication information is a text or voice signal, the vehicle host C12 can broadcast this text or voice signal.

As shown in FIGS. 3, 6a and 6b again, in some embodiments, the license plate image I1 includes a license plate number and an advertisement image. The motherboard 114 drives the display panel 110 according to a driving signal to display the license plate number in the passive region 122, and drives the display panel 110 according to a flame-out signal to display, in the passive region 122, the advertisement image. The driving signal and the flame-out signal may be sent by the vehicle host C12 to the motherboard 114. The driving signal may refer to a signal generated by the vehicle host C12 when the first vehicle C1 is in the driving state. The flame-out signal may refer to a signal generated by the vehicle host C12 when the first vehicle C1 is in a flame-out state. By way of example, when the first vehicle C1 is in the driving state, the motherboard 114 may control the license plate image I1 to only display the license plate number to comply with the local traffic regulations and recognize the first vehicle C1. When the first vehicle C1 is in the flame-out state, the motherboard 114 may control the license plate image I1 to display both the license plate number and advertisement image, such that the first vehicle C1 can push an advertisement without influencing recognition.

In summary, according to the smart license plate 10 in some embodiments, the display panel 110 is divided into the active region 120 and the passive region 122 by the frame 112. The first light-emitting assembly 104 corresponds to the passive region 122 and is configured to emit the first light ray L1 towards the passive region 122 when driven. The second light-emitting assembly 106 corresponds to the active region 120 and is configured to emit the second light ray L2 towards the active region 120 when driven. Moreover, the controller 108 is coupled to the first light-emitting assembly 104 and the second light-emitting assembly 106, and the controller 108 selectively drives the first light-emitting assembly 104 and the second light-emitting assembly 106. The active region 120 is configured to send the optical communication signal, and the passive region 122 is configured to display the license plate image I1 or the advertisement image. Furthermore, the motherboard 114 can selectively drive the first light-emitting assembly 104 to increase the brightness of the passive region 122, such that the external camera lens can clearly capture the license plate image I1. The motherboard 114 can selectively drive the second light-emitting assembly 106, such that the external camera lens C22 can capture the image including the optical communication signal with the cooperation of the second light ray L2 and the dark-state image I2 and the bright-state image I3 of the active region 120.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A smart license plate, comprising:
   a display assembly, comprising: a display panel, having a display surface and a mounting surface; a frame, connected to the display surface, and the display surface being divided into an active region and a passive region; and a motherboard, connected to the mounting surface and coupled to the display panel, wherein a license plate image is displayed selectively in the passive region via the display panel driven by the motherboard;
   a first light-emitting assembly, corresponding to the passive region, emitting a first light ray towards the passive region when driven;
   a second light-emitting assembly, corresponding to the active region, emitting a second light ray selectively towards one or both of a first sub-region and a second sub-region of the active region when driven
   a controller, coupled to the first light-emitting assembly and the second light-emitting assembly, wherein the first light-emitting assembly and the second light-emitting assembly are driven selectively by the controller.

2. The smart license plate according to claim 1, wherein the second light-emitting assembly is driven by the controller according to a broadcast information to emit the second light ray, and an optical communication signal is formed by the second light ray selectively irradiating upon the first sub-region and the second sub-region.

3. The smart license plate according to claim 2, wherein the display panel selectively displays one of a dark-state image and a bright-state image in the first sub-region and the second sub-region when driven by the motherboard, and the optical communication signal is formed by the second light ray selectively irradiating upon the first sub-region and the second sub-region.

4. The smart license plate according to claim 2, wherein the frame comprises a first edge strip, a second edge strip, a third edge strip, a fourth edge strip, and a first division strip; the first edge strip, the second edge strip, the third edge strip, and the fourth edge strip sequentially connect and surround the display surface, and the first division strip connects the first edge strip and the second edge strip, and the display surface is divided into the active region and the passive region.

5. The smart license plate according to claim 4, wherein a height of the first division strip is essentially equal to a height of the first light-emitting assembly and a height of the second light-emitting assembly.

6. The smart license plate according to claim 5, wherein the frame further comprises a second division strip, the second division strip connects the fourth edge strip and the first division strip, and the active region is divided by the second division strip into the first sub-region and the second sub-region.

7. The smart license plate according to claim 6, wherein a height of the second division strip is essentially equal to the height of the second light-emitting assembly.

8. The smart license plate according to claim 2, wherein the active region is divided by the frame into the first sub-region and the second sub-region, the second light-emitting assembly comprises a first sub-assembly and a second sub-assembly, the second light ray comprises a first sub-light ray and a second sub-light ray, the first sub-assembly is disposed corresponding to the first sub-region to emit the first sub-light ray towards the first sub-region when driven, the second sub-assembly is disposed corresponding to the second sub-region to emit the second sub-light ray towards the second sub-region when driven, and the first sub-assembly and the second sub-assembly are driven selectively by the controller.

9. The smart license plate according to claim 8, wherein the first sub-assembly comprises a first long-wave assembly emitting a first long-wave light ray when driven and a first short-wave assembly emitting a first short-wave light ray when driven, the second sub-assembly comprises a second long-wave assembly emitting a second long-wave light ray when driven and a second short-wave assembly emitting a second short-wave light ray when driven, a wavelength of the first long-wave light ray is longer than a wavelength of the first short-wave light ray, and a wavelength of the second long-wave light ray is longer than a wavelength of the second short-wave light ray.

10. The smart license plate according to claim 9, wherein the display panel selectively displays when driven by the motherboard, in the first sub-region, a dark-state image and a bright-state image, and the display panel to selectively displays when driven by the motherboard, in the second sub-region, the dark-state image and the bright-state image, when the first sub-region displays the dark-state image, the first short-wave assembly is driven by the controller, when the first sub-region displays the bright-state image, the first long-wave assembly is driven by the controller, when the second sub-region displays the dark-state image, the second short-wave assembly is driven by the controller, and when the second sub-region displays the bright-state image, the second long-wave assembly is driven by the controller.

11. The smart license plate according to claim 9, wherein the first light ray and the second light ray are each a far-infrared ray.

12. The smart license plate according to claim 9, wherein the wavelength of the first long-wave light ray, the wavelength of the first short-wave light ray, the wavelength of the second long-wave light ray, the wavelength of the second short-wave light ray, and a wavelength of the first light ray are each selected from the group consisting of 940 nm, 1100 nm, 1200 nm, 1340 nm, 1480 nm, and 1550 nm.

13. The smart license plate according to claim 12, wherein the first light-emitting assembly and the second light-emitting assembly each comprise a plurality of light emitting diodes and a plurality of lenses, and each of the lenses is disposed corresponding to one of the light emitting diodes to focus a light ray emitted by the one of the corresponding light emitting diodes.

14. The smart license plate according to claim 2, wherein the frame comprises a first edge strip, a second edge strip, a third edge strip, a fourth edge strip, and a first division strip, the first edge strip, the second edge strip, the third edge strip, and the fourth edge strip sequentially connect and surround the display surface, and the first division strip connects the third edge strip and the fourth edge strip, and the display surface is divided into the active region and the passive region.

15. The smart license plate according to claim 14, wherein the frame further comprises a second division strip, the second division strip connects the second edge strip and the first division strip, and the active region is divided by the second division strip into the first sub-region and the second sub-region.

16. The smart license plate according to claim 15, wherein a height of the first division strip is essentially equal to a height of the first light-emitting assembly and a height of the second light-emitting assembly, and a height of the second division strip is essentially equal to the height of the first division strip.

17. The smart license plate according to claim 2, wherein the frame comprises a first edge strip, a second edge strip, a third edge strip, a fourth edge strip, and two first division strips, the first edge strip, the second edge strip, the third edge strip and the fourth edge strip sequentially connect and surround the display surface, the first division strips are disposed on both sides of the display surface respectively and connected to the first edge strip and the second edge strip, and the display surface is divided by the first division strips into the active region and the passive region, the active region is divided by the frame into the first sub-region and the second sub-region, the second light-emitting assembly comprises a first sub-assembly and a second sub-assembly, the second light ray comprises a first sub-light ray and a second sub-light ray, the first sub-assembly is disposed corresponding to the first sub-region to emit the first sub-light ray towards the first sub-region when driven, the second sub-assembly is disposed corresponding to the second sub-region to emit the second sub-light ray towards the second sub-region when driven, and the first sub-assembly and the second sub-assembly are driven selectively by the controller.

18. The smart license plate according to claim 1, wherein the license plate image comprises a license plate number and an advertisement image, the display panel is driven by the motherboard according to a driving signal to display the license plate number in the passive region, and the display panel is driven by the motherboard according to a flame-out signal to display the license plate number and the advertisement image in the passive region.

19. The smart license plate according to claim 1, wherein the frame further comprises a first light guide plate and a second light guide plate, the first light guide plate is disposed corresponding to the active region, the second light ray is guided by the first light guide plate towards the active region, and the second light guide plate is disposed corresponding to the passive region, the first light ray is guided by the second light guide plate towards the passive region.

20. The smart license plate according to claim 1, further comprising an image capture element and an image processor, wherein an image is captured by the image capture element, the image is processed and a communication information is outputted by the image processor accordingly.

\* \* \* \* \*